No. 804,007. PATENTED NOV. 7, 1905.
G. HIGGINSON.
TEMPORARY BINDER, LOOSE LEAF LEDGER, AND THE LIKE.
APPLICATION FILED SEPT. 12, 1904.

2 SHEETS—SHEET 1.

WITNESSES:
Fred White
René Bruine

INVENTOR:
George Higginson,
By his Attorneys
Arthur E. Fraser & Co.

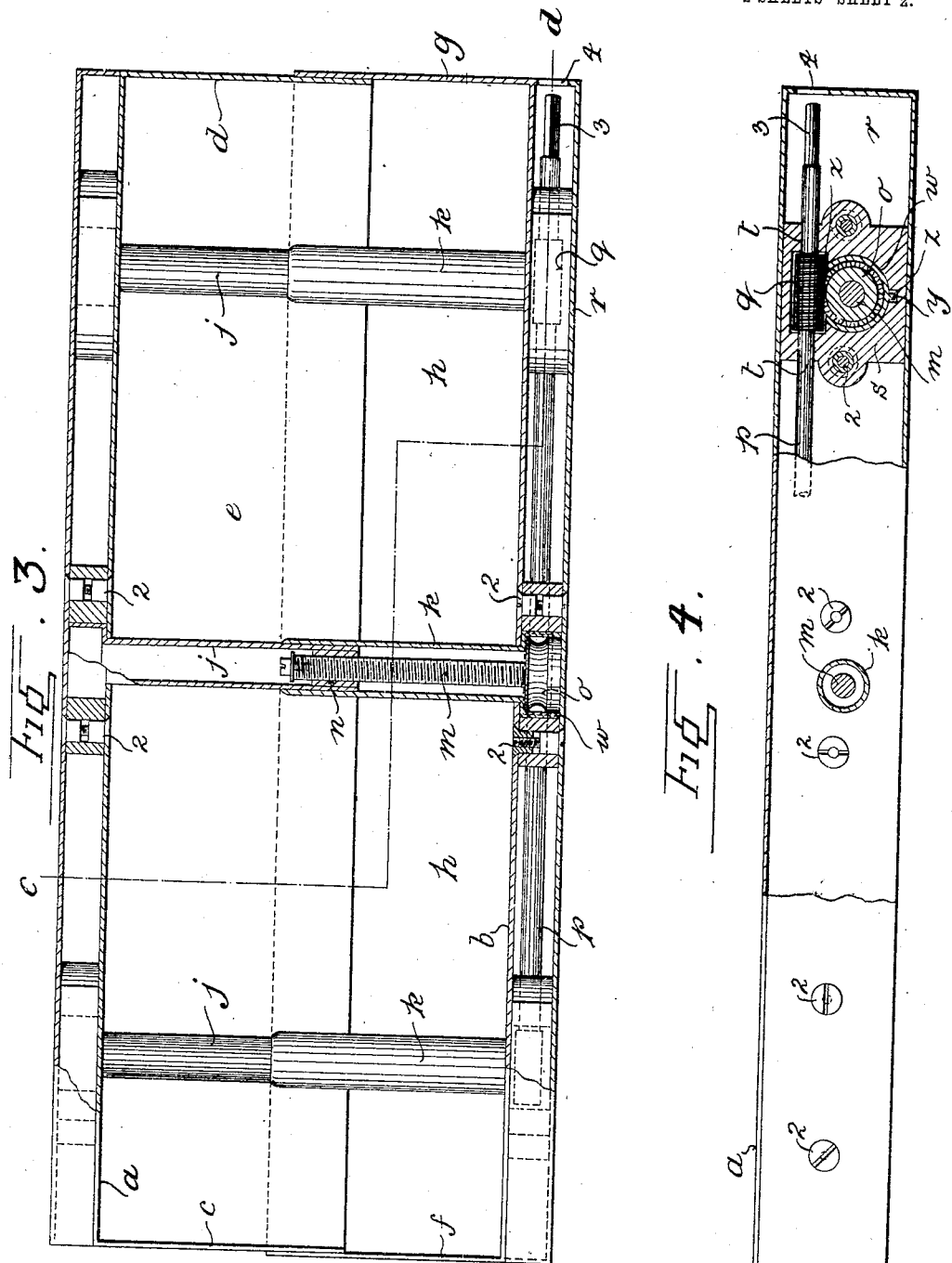

UNITED STATES PATENT OFFICE.

GEORGE HIGGINSON, OF LONDON, ENGLAND, ASSIGNOR TO HARRY ROBERT SAUVÉ PULMAN, OF LONDON, ENGLAND.

TEMPORARY BINDER, LOOSE-LEAF LEDGER, AND THE LIKE.

No. 804,007.        Specification of Letters Patent.        Patented Nov. 7, 1905.

Application filed September 12, 1904. Serial No. 224,098.

*To all whom it may concern:*

Be it known that I, GEORGE HIGGINSON, mechanical engineer, of 1 and 2 Ham Yard, Piccadilly, London, England, have invented certain new and useful Improvements in and Relating to Temporary Binders, Loose-Leaf Ledgers, and the Like, of which the following is a specification.

This invention relates to temporary binders, loose-leaf ledgers, and the like, and has for its object to provide an improved means for temporarily binding leaves of ledgers and other documents.

A temporary binder, loose-leaf ledger, or the like made in accordance with my invention is provided with a pair of plates having filing or telescopic members passing therethrough and adapted to pass through perforations in the documents to be filed and to be drawn together by screws passing through one or more of the members on one of the plates and engaging with a nut or nuts in the corresponding member or members on the other plate, said screws being provided with worm-wheel heads and operated simultaneously by worms on a spindle.

Figure 1:
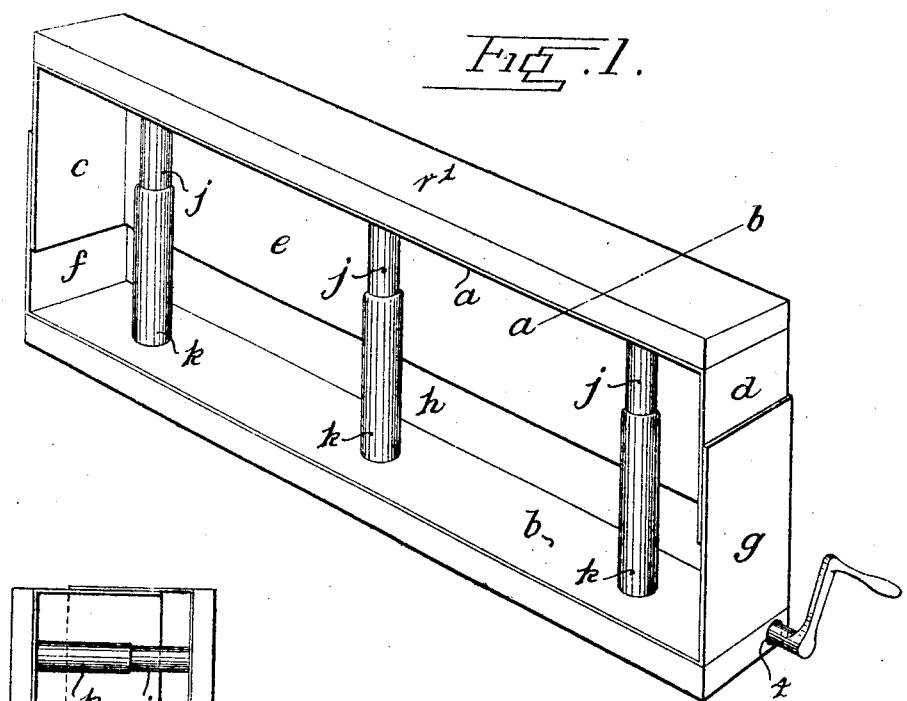
Figure 5:
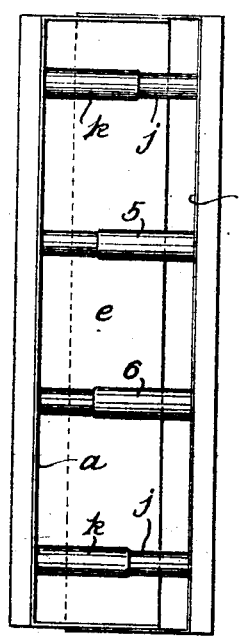
Figure 2:
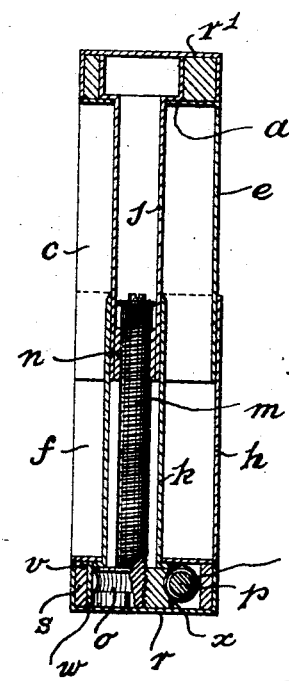

Referring to the drawings, Figure 1 is a perspective view of one form of temporary binder made in accordance with my invention. Fig. 2 is a cross-section on line $ab$, Fig. 1. Fig. 3 is a front elevation, partly in section. Fig. 4 is a plan, partly in section, on line $cd$ of Fig. 3. Fig. 5 is a front view of a modified form of construction.

In one form of binder made in accordance with my invention and shown in the drawings each of the plates $a$ and $b$ is provided with back and side flanges, one plate $a$ being slightly smaller than the other, $b$, so that the side flanges $c$ and $d$ and back flange $e$ thereof may slide within the side flanges $f$ and $g$ and back flange $h$ of the other plate $b$. Passing through the plate $a$ are disposed three tubes and filing members $jjj$ and through the plate $b$ tubes $kkk$. Within each of the tubes $kkk$ of the plate $b$ is disposed a screw $m$, adapted to engage with a nut $n$ in the corresponding tube $j$ of the other plate $a$, and said screws are provided with worm-wheel heads $o$ and adapted to be operated by a spindle $p$, carrying worms $q$, engaging therewith. The tubes $jj$—i. e., those containing the nuts $n$—are of smaller diameter than the tubes $k$ and are adapted to slide therein. At the back of each plate $a$ and $b$ is a casing $rr$. In one casing $r$ are disposed blocks $s$, adapted to form bearings $t$ for the worm-spindle $p$ and also to serve as distance-pieces between the casing $r$ and the plates $a$ and $b$. The blocks are provided with apertures $v$ for the reception of the tubes $k$ and worm-wheel heads $o$. The ends of these tubes are preferably enlarged or swelled, as at $w$, at that portion which is within the blocks, so as to form suitable bearings for the worm-wheel heads $o$, and this also prevents the tubes from being drawn through the apertures $v$ in plates $a$ and $b$ in the blocks. Part of the swelled end of each tube is cut away, as at $x$, so as to permit of the worm $q$ engaging with the worm-wheel $o$, and a projection $y$ is provided on each tube and adapted to engage with a corresponding slot or groove $z$ in each block, as in Fig. 4, to prevent the tube from being rotated. The casing is secured to the plate $b$, and the blocks are held in the casing by screws $2\ 2$ passing therethrough. One end of the worm-spindle is or may be square or other section, as at 3, and adapted to be turned by a key passing through a hole 4 in the casing $b$. The tubes $j$, passing through the plate $a$, are provided with swelled ends and are held in blocks similar to the blocks $s$, except that no provision is made for the worm-gearing.

When the parts are assembled, the two plates $a$ and $b$ are opposed to one another, so that the smaller tubes $j$ fit into the larger tubes $k$ and the screws $m\ m$ meet the nuts $n\ n$. On turning the worm-spindle $p$ the screws $m$ are caused to rotate and engaging with the nuts $n$ draw the plates $a$ and $b$ together. Documents or pages to be filed having been punched and previously placed on the tubes are firmly held by the plates when drawn together.

Fig. 5 shows a modified form wherein four sliding tubular members are employed. In this case two only of said sliding members would be operated by worm-gear, preferably the two inner ones marked 5 and 6, while the other two may be reversed—that is to say, the external tube $k$ would be fixed to the upper plate $a$ and the internal tube $j$ attached to the lower plate $b$. Also in some cases where three sliding members are employed, as shown in Fig. 1, I may reverse the position of the center sliding tubular member, as above described in reference to Fig. 5. The oppositely-arranged or reversed sliding members would of course not be operated by worm-gear.

A temporary binder, loose-leaf ledger, or the like made in accordance with my invention is neat in appearance, as none of the working parts are exposed or visible. The method of securing the tubes in position permits of a little lateral play, and the screws and worm-wheel heads are perfectly free from the casing and plate. The parts being interchangeable, the apparatus is very cheap in manufacture.

What I claim, and desire to secure by Letters Patent, is—

1. In a temporary binder, two plates, two non-rotative tubular binding members adapted to telescope one within the other, and a screw arranged to rotate in one of said members and to engage the other of said members, said first-named member having an enlarged tubular head and said screw having a worm-wheel at its end fitting within said head, whereby the latter forms a bearing for said worm-wheel.

2. In a temporary binder, two plates, two non-rotative tubular binding members adapted to telescope one within the other, a screw arranged to rotate in one of said members and to engage the other of said members, said first-named member having an enlarged tubular head and said screw having a worm-wheel at its end fitting within said head, whereby the latter forms a bearing for said worm-wheel, a worm engaging said worm-wheel and adapted to rotate said screw, and a block surrounding said head, and forming a bearing for said worm.

3. The improved temporary binder comprising the combination of two plates, filing members passing through each of said plates, the filing members of one plate being adapted to telescope with the filing members of the other plate, each of said filing members being provided with an enlarged end adapted to bear against one of the plates, a casing on each plate adapted to inclose the enlarged ends of the filing members, screws disposed in a plurality of the filing members of one of the plates and nuts disposed in the corresponding filing members of the other plate, said screws being provided with worm-wheel heads, a spindle disposed in one of the casings, worms on the spindle adapted to engage with the worm-wheel heads of the screws, blocks in one of the casings adapted to form bearings for the spindle, each of said blocks being provided with a recess for the enlarged ends of the filing members and for the worm-wheel heads, blocks in the other casing adapted to form a bearing for the enlarged ends of the filing members, substantially as and for the purpose set forth.

In witness whereof I have hereunto signed my name in the presence of two subscribing witnesses.

GEORGE HIGGINSON.

Witnesses:
ROBERT MILTON SPEARPOINT,
REGINALD EATON ELLIS.